United States Patent
Kim et al.

(10) Patent No.: US 7,864,642 B2
(45) Date of Patent: Jan. 4, 2011

(54) METHOD OF OPTIMIZING A WRITE STRATEGY BASED ON AN ADAPTIVE WRITE STRATEGY STUDY AND OPTICAL RECORDING APPARATUS USING THE SAME

(75) Inventors: Min-seok Kim, Suwon-si (KR); Yong-jin Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1180 days.

(21) Appl. No.: 11/405,526

(22) Filed: Apr. 18, 2006

(65) Prior Publication Data
US 2006/0250920 A1 Nov. 9, 2006

(30) Foreign Application Priority Data
May 9, 2005 (KR) .................. 10-2005-0038414
May 10, 2005 (KR) .................. 10-2005-0038915

(51) Int. Cl.
*G11B 7/00* (2006.01)

(52) U.S. Cl. .................. 369/47.53; 369/53.26

(58) Field of Classification Search ..... 369/47.5–47.53, 369/53.27, 53.31, 53.35, 53.36
See application file for complete search history.

(56) References Cited

U.S. PATENT DOCUMENTS

| | | | |
|---|---|---|---|
| 5,706,271 A | | 1/1998 | Hashimoto |
| 5,818,807 A | | 10/1998 | Kuroda et al. |
| 6,839,131 B2 | | 1/2005 | Kwon |
| 6,875,997 B2 * | | 4/2005 | Park et al. ............... 257/48 |
| 6,906,987 B2 * | | 6/2005 | Kim ............... 369/47.1 |
| 6,987,717 B2 * | | 1/2006 | Hagiwara et al. ........ 369/47.53 |
| 7,046,599 B2 * | | 5/2006 | Matsumoto ............ 369/47.5 |
| 7,145,851 B2 * | | 12/2006 | Fukushima et al. ....... 369/47.5 |
| 2002/0044507 A1 * | | 4/2002 | Hagiwara et al. ........ 369/47.53 |
| 2002/0064110 A1 * | | 5/2002 | Sato ................ 369/47.53 |
| 2003/0058765 A1 | | 3/2003 | Schreurs et al. |
| 2003/0123361 A1 * | | 7/2003 | Kodama ............. 369/53.34 |
| 2005/0018572 A1 | | 1/2005 | Gushima et al. |
| 2005/0052975 A1 | | 3/2005 | Banno |

FOREIGN PATENT DOCUMENTS

CN 1428769 7/2003

(Continued)

OTHER PUBLICATIONS

Search Report issued in European Patent Application No. 06113533.1 on Feb. 1, 2007.

(Continued)

*Primary Examiner*—Thang V Tran
(74) *Attorney, Agent, or Firm*—Stanzione & Kim, LLP

(57) ABSTRACT

A method of optimizing a write strategy (WS) based on an adaptive WS study used in an optical recording apparatus includes recording buffered user data to a rewritable optical disk, performing a WS study when the recording of the buffered user data is completed, and recording additional user data that is buffered afterward according to an WS obtained based on the WS study. Accordingly, since an optimal WS is obtained in real time by performing the WS study during an interval occurring during the UD recording operation, the UD is optimally recorded.

16 Claims, 3 Drawing Sheets

FOREIGN PATENT DOCUMENTS

| | | |
|---|---|---|
| EP | 1 306 839 A2 | 5/2003 |
| JP | 08-329468 | 12/1996 |
| JP | 09-198661 | 7/1997 |
| JP | 11-134653 | 5/1999 |
| JP | 2000-113456 | 4/2000 |
| JP | 2001-283509 | 10/2001 |
| JP | 2002-025068 | 1/2002 |
| KR | 1998-78070 | 11/1998 |
| KR | 2001-58863 A | 7/2001 |
| KR | 2002-90367 A | 12/2002 |
| KR | 2003-8538 A | 1/2003 |

OTHER PUBLICATIONS

Office Action issued Nov. 23, 2007 from the Chinese Patent Office with respect to Chinese Patent Application No. 200610073607.8, filed on Apr. 14, 2006.

Office Action issued in Korean Patent Application No. 2005-38915 on May 10, 2005.

U.S. Appl. No. 11/405,527, filed Apr. 18, 2006, Min-seok Kim et al., Samsung Electronics Co., Ltd.

* cited by examiner

METHOD OF OPTIMIZING A WRITE STRATEGY BASED ON AN ADAPTIVE WRITE STRATEGY STUDY AND OPTICAL RECORDING APPARATUS USING THE SAME

CROSS-REFERENCE TO RELATED APPLICATION

This application claims the benefit under 35 U.S.C. § 119 from Korean Patent Applications Nos. 2005-38915 and 2005-38414, filed on May 10, 2005 and May 9, 2005 in the Korean Intellectual Property Office, the entire content of which is incorporated herein by reference.

BACKGROUND OF THE INVENTION

1. Field of the Invention

Aspects of the present invention relate to a write strategy (WS) optimizing method and an optical recording apparatus using the same. More particularly, aspects of the present invention relate to a method of optimizing a WS by performing an adaptive WS study and an optical recording apparatus using the same.

2. Description of the Related Art

An optical recording apparatus performs a WS study before recording user data to a user data area of a mounted optical disk. The WS study is performed to obtain an optimal WS. In order to improve a data recording performance, the WS study precedes the user data recording process and user data is recorded according to the optimal WS.

The WS study is performed when an optical disk is mounted (inserted) in the optical recording apparatus and is not performed during the user data recording operation. This means that the WS obtained at the time of mounting the optical disk does not change afterwards. However, the WS obtained at the time of mounting the optical disk is not always be suitable to the user data recording operation. More specifically, if the WS study is improperly performed or if a medium characteristic of the optical disk changes due to recording operations performed several times in the user data area, the WS obtained at the time of mounting the optical disk does not necessarily remain the optimal WS. In order to obtain an optimal WS, the WS has to be modified.

The WS study is performed in a test recording area of the optical disk. The test recording area is provided in the optical disk and dedicated to the WS study. Once the test recording area of recording area is used for a test recording, it cannot be again used for the test recording. That is, the WS study is performed on an unused point of the test recording area that has never been used for a test recording.

On the other hand, there is an optical disk that allows re-writing the user data to a user data area several times. Such an optical disk is called a rewritable optical disk. Like the general optical disk, the rewritable optical disk has a test recording area to perform a WS study and the WS is performed on an unused point of test recording area that has never been used for a test recording. However, since the WS study to obtain an optimal WS is performed in the test recording area that has never been used for a data recording, the obtained WS would not be appropriate for the case that user data is recorded to a user data area that has been used several times for data recording.

That is, there is a difference between medium characteristics of the user data area that has been used several times for a data recording and the test recording area that has never been used for a data recording. This difference results from the change in the medium characteristic of the user data area caused by the several recording operations. Therefore, if the WS is obtained by performing the WS study on the test recording area, it may not suitable for the case that user data is recorded to the user data area that has been used several times for the data recording. This is more problematic if the number of data rewriting operations increases.

SUMMARY OF THE INVENTION

Aspects of the present invention provide a method of optimizing a write strategy (WS) by performing a WS study during an interval occurring between user data recording operations, and an optical recording apparatus using the same.

According to an aspect of the present invention, a write strategy (WS) optimizing method includes recording a buffered portion of user data to a rewritable optical disk, performing a WS study when the recording of the buffered user data is completed, and recording later buffered user data according to an WS obtained based on the performed WS study.

According to an aspect of the present invention, but not necessarily, the performing the WS study is performed until the user data to be later recorded is completely buffered.

According to an aspect of the present invention, the WS optimizing method further includes checking whether a recording information about the portion user data that has been completely recorded is normally recorded, wherein the performing the WS study is performed if it is determined that the recording information is abnormally recorded.

According to an aspect of the present invention, wherein the performing the WS study includes determining one of a recording information area in which the recording information is recorded and a test recording area as a WS study area to perform the WS study, and performing the WS study in the determined WS study area.

According to an aspect of the present invention, the determining the WS study area comprises determining an area including unusable blocks of the recording information area that are not expected to be used in recording the user data as the WS study area.

According to an aspect of the present invention, the determining the WS study area comprises determining an area including blocks of the recording information area that have been used to record the recording information a predetermined number of times as the WS study area.

According to an aspect of the present invention, the determining the WS study area comprises determining the area including unusable blocks as the WS study area if the number of unusable blocks is greater than or equal to a predetermined number.

According to an aspect of the present invention, the determining the WS study area comprises determining the test recording area as the WS study area if the number of unusable blocks is less than the predetermined number.

According to an aspect of the present invention, an optical recording apparatus includes an optical pickup to record buffered user data to a rewritable optical disk, an optical pickup driving unit to drive the optical pickup, and a controller to control the optical pickup driving unit such that the optical pickup performs a write strategy (WS) study when the buffered user data is completely recorded and later records later buffered user data according to a WS obtained based on the WS study.

According to an aspect of the present invention, the WS study is performed until the later buffered user data to be recorded afterward is completely buffered.

According to an aspect of the present invention, the optical recording apparatus further includes a checking unit to check whether a recording information about the user data that has been completely recorded is normally recorded, wherein the controller controls the optical pickup driving unit such that the optical pickup performs the WS study if the checking unit determines that the recording information is abnormally recorded.

According to an aspect of the present invention, the optical recording apparatus further includes a determination unit to determine one of a recording information area in which the recording information is recorded and a test recording area as a WS study area to perform the WS study, wherein the controller controls the optical pickup driving unit such that the optical pickup performs the WS study in the determined WS study area.

According to an aspect of the present invention, the determination unit determines an area including unusable blocks of the recording information area that are not expected to be used in recording the user data as the WS study area.

According to an aspect of the present invention, the determination unit determines an area including blocks of the recording information area that have been used to record the recording information a predetermined number of times as the WS study area.

According to an aspect of the present invention, the determination unit determines the area including unusable blocks as the WS study area if the number of unusable blocks is greater than or equal to a predetermined number.

According to an aspect of the present invention, the determination unit determines the test recording area as the WS study area if the number of unusable blocks is less than the predetermined number.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE EMBODIMENTS

Figure 1:
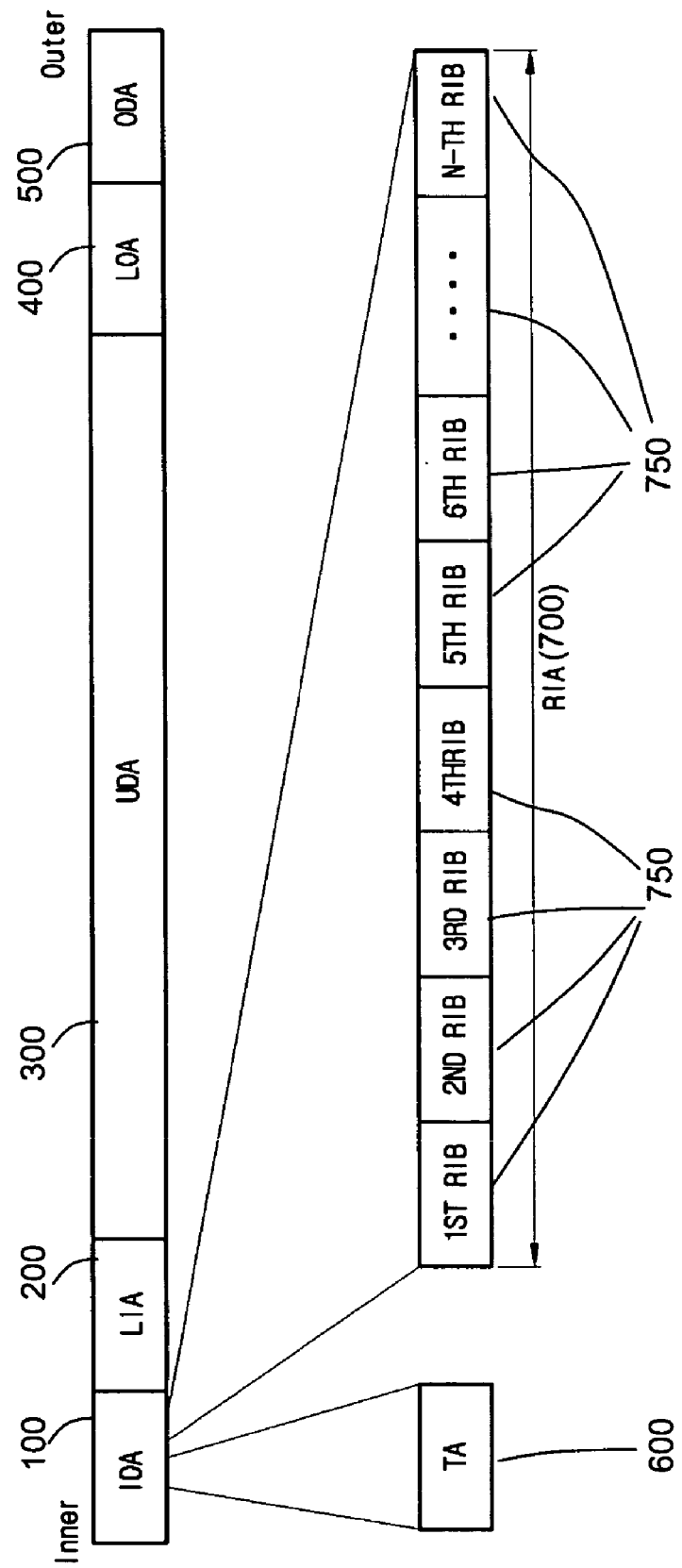
FIG. 1 is a view illustrating a format of a rewritable optical disk applicable to an aspect of the present invention.

Hereinafter, aspects of the present invention will now be described in greater detail with reference to the accompanying drawings, wherein like reference numerals refer to the like elements throughout. The embodiments are described below in order to explain the present invention by referring to the figures.

FIG. 1 is a view illustrating a format of a rewritable optical disk applied to an aspect of the present invention. Referring to FIG. 1, a rewritable optical disk (referred to as "an optical disk", hereinbelow) has an inner drive area (IDA) 100, a lead in area (LIA) 200, a user data area (UDA) 300, a lead out area (LOA) 400, and an outer driver area (ODA) 500 from the inner side to the outer side. The UDA 300 records thereto user data (UD) such as audio/video (AV) data.

The IDA 100, LIA 200, LOA 400 and ODA 500 record thereto data about managing, reproducing and recording operations of the optical disk. The IDA 100 has a test area (TA) 600 and a recording information area (RIA) 700. The TA 600 is used for a write strategy (WS) study. The RIA 700 records recording information (RI) about the user data recorded to the UDA 300. The RIA 700 includes a plurality of recording information blocks (RIBs) (first to N-th RIBs 750). While described as including recording information blocks 750 in the shown example, it is understood that the RIA 700 can include other information, blocks, and/or areas according to other aspects of the invention.

The recording of the recording information is performed in parallel with the recording of user data. To be specific, if a predetermined amount of user data is recorded to the UDA 300, information about the currently recorded user data is initially recorded to the RIB 750 as recording information. If a predetermined amount of user data is additionally recorded to the UDA 300 afterwards, information about the currently recorded user data is recorded to the RIB 750 as new recording information. That is, the recording information continues to be updated during the process of recording the user data.

Since the recording information is about the recorded user data, the recording information is an important factor to reproduce the user data. Therefore, if the user data recording is normally performed but the RI initial recording or rewriting (referred to as "RI recording" hereinafter) is not normally performed, it is impossible to reproduce the user data. Accordingly, when the recording information recording is completed, it has to be determined whether the recording information recording is normally performed. If it is determined that the recording information recording is normally performed in a certain RIB 750, the certain RIB 750 continues to be used for the RIB recording. However, if the recording information recording is not normally performed in a certain RIB 750, the certain RIB 750 is not used for the recording information recording anymore and the next recording information is scheduled to perform the recording information recording.

For example, if a recording information recording is performed in a first RIB 750 and is determined to be abnormal, the second RIB 750 is scheduled to perform the recording information recording.

Accordingly, RIBs 750 located before a current RIB 750 that is currently recording the recording information have been used several times for the recording information recording. Thus, these previously used RIBs 750 would not be used for the user data recording. For example, if a recording information recording is currently performed in the sixth RIB 750, the first to fifth RIBs 750 have been already used to record the recording information several times. Thus, the first to fifth RIBs 750 would not be used for recording information related to current user data recording.

Since the RIBs 750 located before the current RIB 750 have been used several times for the recording information recording, their medium characteristics are similar to that of the UDA 300 that changes due to the multiple rewriting operations of the user data. Thus, the RIBs 750 located before the current RIB 750 have a medium characteristic that is suitable for performing the WS in order to more closely approximate the medium characteristic of the UDA 300 which has been overwritten several times.

Up to now, the format of the optical disk applicable to an aspect of the present invention was described. Examples of the optical disk are a rewritable compact disk (CD), a digital video disk (DVD), a Blue-Ray disk (BD), an Advanced Optical Discs (AODs) and an HD-DVD. Any other types of rewritable optical disk can be used in the embodiment of the present invention.

Similarly, it is understood that other terms may be used for the respective areas of the optical disk, depending on the types of optical disks. For example, although the term RIA 700 is used for the DVD-RW shown in FIG. 1, other like terms include table of contents zone' (TCZ) and disk identification zone (DIZ) as used for the DVD+RW and the DVD-RAM, respectively. Hereinbelow, while described in terms of the RIA 700, it is understood that aspects of the invention can be similarly applied to TCZ and DIZ. Also, although the term TA 110 is used in FIG. 1, other like terms include power calibration area (PCA) and inner disk test zone (IDTZ) are used for the DVD-RW and DVD+RW, respectively. Hereinbelow, while described in terms of the TA 600, it is understood that aspects of the invention can be similarly applied to the PCA and IDTZ.

Figure 2:
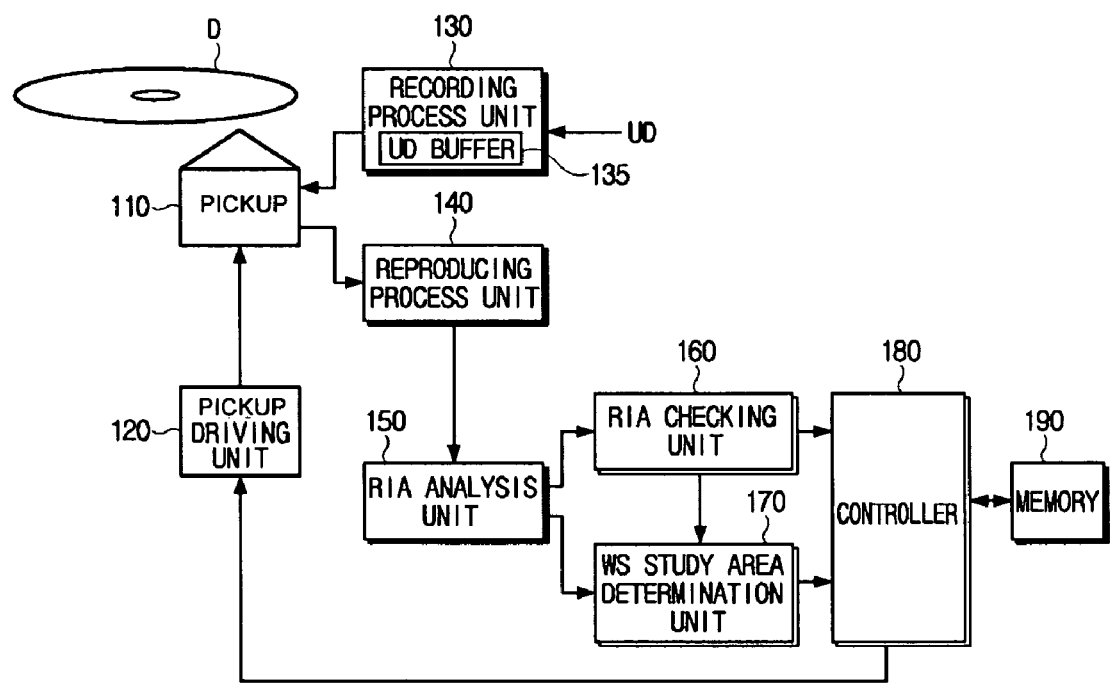
FIG. 2 is a block diagram illustrating an optical recording apparatus which optimizes a WS by performing an adaptive WS study according to an embodiment of the present invention.

FIG. 2 is a block diagram illustrating an optical recording apparatus according to an embodiment of the present invention. While referred to as a recording apparatus and while not required in all aspects, it is understood that the apparatus can further perform reproducing in other aspects of the invention. The optical recording apparatus optimizes a WS by performing an adaptive WS study. Herein, the adaptive WS study is a WS study that is additionally performed during an interval occurring between user data recording operations and thereby optimizes the WS. As shown in FIG. 2, the optical recording apparatus comprises a pickup 110, a pickup driving unit 120, a recording process unit 130 having a buffer 135, a reproducing process unit 140, a RIA analysis unit 150, a RIA checking unit 160, a WS study area determination unit 170, a controller 180, and a memory 190.

The pickup 110 is driven by the pickup driving unit 120 to read data from a mounted optical disk D and output electric signals corresponding to the read data to the reproducing process unit 140. The reproducing process unit 140 processes the electric signals received from the pickup 110. The pickup 110 records the user data that is buffered by the user data buffer 135 after being signal-processed by the recording process unit 130 to the optical disk D. The RIA analysis unit 150 analyzes the RIA 700 based on the signals output from the reproducing process unit 140 and outputs the result of the analysis.

The RIA checking unit 160 checks whether the recording information recording is normally performed based on the RIA analysis result output from the RIA analysis unit 150, and transmits a result of the checking to the WS study area determination unit 170 and the controller 180. The WS study area determination unit 170 chooses between the RIA and the TA 600 to be a WS study area based on the result of the RIA analysis output from the RIA analysis unit 150. The above-described adaptive WS study is performed in the chosen WS study area.

The controller 180 determines whether to perform an adaptive WS study based on the result of the checking of the RIA checking unit 160. If the adaptive WS study is determined to be performed, the controller 180 controls the pickup driving unit 120 such that the pickup 110 performs the WS study in the chosen WS study area, and stores the WS obtained by performing the WS study to the memory 190. The controller 180 controls the pickup driving unit 120 such that the pickup 110 subsequently performs additional user data recording according to the WS stored in the memory 190.

Figure 3:
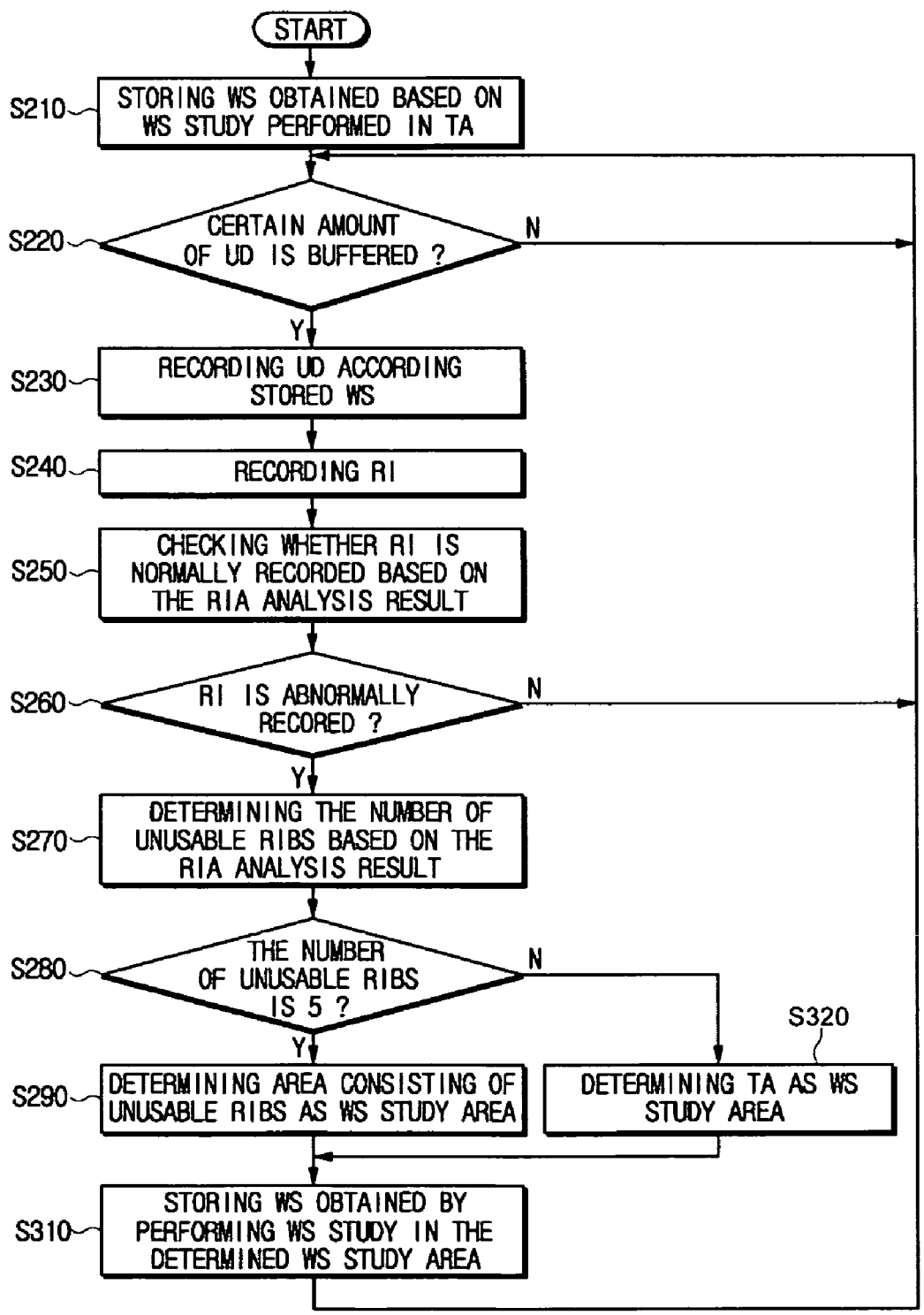
FIG. 3 is a flowchart illustrating a method of optimizing a WS by performing an adaptive WS study according to an embodiment of the present invention.

FIG. 3 is a flowchart illustrating a method of optimizing a WS by performing an adaptive WS study according to an embodiment of the present invention. Referring to FIG. 3, the controller 180 stores a WS that is obtained based on a WS study performed in the TA 600 of the optical disk D at operation S210. More specifically, the operation S210 includes the controller 180 controlling the pickup driving unit 120 such that the pickup 110 performs the WS study in the TA 600 of the optical disk D, and storing the WS obtained based on the WS study to the memory 190. The controller 180 determines whether a certain amount of user data is buffered in the user data buffer 135 of the recording processing unit 130 at operation S220.

If it is determined that the certain amount of user data is buffered at the operation S220, the controller 180 controls the pickup driving unit 120 such that the pickup 110 records user data according to the stored WS at operation S230. More specifically, at the operation S230, the controller 180 controls the pickup driving unit 120 such that the pickup 110 records the user data according to the WS stored in the memory 190.

If the recording operation of the buffered user data is completed, the controller 180 controls the recording information to be recorded at operation S240. More specifically, at the operation S240, the controller 180 controls the pickup driving unit 120 such that the pickup 110 records a recording information about the recorded user data to a corresponding RIB 750. The RIA checking unit 160 checks whether the RI is normally recorded based on the result of the RIA 700 analysis output from the RIA analysis unit 150 at operation S250. The result of the checking of the operation S250 is transmitted to the WS study area determination unit 170 and the controller 180.

If it is determined that the recording information is abnormally recorded at operation S260, the WS study area determination unit 170 determines the number of unusable RIBs. The unusable RIBs have been used several times to record the RI, and thus are not expected to be used in recording the user data. Where enough unusable RIBs accumulate, this is an indication of multiple recordings. As such, the number of unusable RIBS both indicates when an optimal WS should be performed, and also indicates that the unusable RIBs make up an area having a similar medium characteristic to that of the UDA 300 that has been used several times for a rewriting operation. As such, the unusable RIBs themselves become a more suitable WS study area as compared to the test area 600. In contrast, where fewer unusable RIBs have accumulated, the test area 600 has a similar medium characteristic to the UDA 300 and can be as suitable a WS study area as the unusable RIBs.

More specifically, at operation S270, the WS study area determination unit 170 determines the number of unusable RIBs using information about the RIB for recording the RI output as the result of the RIA analysis from the RIA analysis unit 150. For example, if the sixth RIB 750 is expected to record the recording information, the first to fifth RIBs 750 have been several times to record the recording information and thus are not expected to be used in recording the user data. Accordingly, the WS study area determination unit 170 determines that there are five (5) unusable RIBs.

If the number of unusable RIBs is greater than or equal to 5 at operation S280, the WS study area determination unit 170 selects an area having of the unusable RIBs as the WS study area at operation S290. For example, if there are five unusable RIBs (first to the fifth RIBs), the selected WS study area is the first to the fifth RIBs. However, while the number 5 is used as a predetermined number, it is understood that other numbers can be the predetermined number according to the medium characteristic of the optical recording medium as a function of overwrites. It is also understood that the WS study area need not be all of the previously used RIBs and instead may be only selected ones of the previously used RIBs most likely to approximate the medium characteristic of the UDA 300 according to aspects of the invention.

The controller 180 stores a WS that is obtained by performing a WS study in the WS study area determined at operation S290, thereby updating the pre-stored WS at operation S310. Since the operation S310 is the substantially same as the operation S210, its description is omitted. If the number of unusable RIBs is greater than or equal to the predetermined number such as 5, it turns out that the user data is rewritten to the UDA 300 of the optical disk D several times. That is, as the number of user data rewriting operations increases, the number of unusable RIBs 750 increases. The medium characteristic of the UDA 300 is similar to that of the unusable RIBs 750 other than the medium characteristic of the TA 600. Accordingly, the unusable RIBs 750 is a more suitable area to perform a WS study and the WS obtained by use of the unusable RIBs 750 is a more suitable WS to be applied to the user data recording.

If the number of the unusable RIBs is less than 5 at operation S280, the WS study area determination unit 170 selects the TA 600 as the WS study area at operation S305. The controller 180 stores a WS obtained by performing a WS study in the determined TA 600, thereby updating the previously stored WS at operation S310. This is because an area taken up by the unusable RIBs less than 5 is not sufficient to perform the WS study for the purposes of the example. However, it is understood that, in other aspects of the invention, the area taken up by the unusable RIBs less than the predetermined number may be sufficient to perform the WS such that the unusable RIBs can still be used as a WS study area in addition to or instead of the TA 600.

Also, if the number of unusable RIBs is less than the predetermined number (in this example 5), it turns out that the number of user data rewriting operations performed in the UDA 300 is relatively small. Accordingly, the medium characteristic of the UDA 300 is similar to that of the TA 600 other than the medium characteristic of the unusable RIBs. Accordingly, the TA 600 is often a more suitable area to perform a WS study and the WS obtained by use of the TA 600 is a more suitable WS to be applied to the user data recording. However, it is understood that the TA 600 may not be more suitable in all aspects of the invention.

After the operation S310, the operation S220 re-starts. That is, the user data buffered in the UD buffer 135 after the operation S230 is recorded according to the WS obtained and stored at operation S310. The operations S240 to S310 are performed until the next user data is buffered in the user data buffer 135 after the user data is recorded at the operation S230. In other words, the operations S240 to S310 are performed until the user data buffer 135 becomes full of the next user data after the user data recorded at the operation S230. This is possible in view of a current high recording data rate of the optical recording apparatus. That is, since an amount of user data flowing out to be recorded is larger than an amount of an user data flowing into the user data buffer 135 at a certain time, the optical recording apparatus has an interval between the time that a certain amount of user data is recorded and the time that a certain amount of next user data is buffered. The operations S240 to S310 are performed during this interval. In this manner, the WS is maintained at an optimal WS without interrupting the recording process. Thus, according to an aspect of the invention, the WS optimization strategy performs the WS optimization in real time as the recording is performed (i.e., without interrupting the recording process). However, it is understood that the WS optimization strategy need not be performed in real time and can be performed between recording operations instead of during intervals of the recording operation. Also, it is understood that the optimization strategy need not be performed for each interval, and instead can be performed at selected ones of the intervals according to aspects of the invention.

Also, it takes a small amount of time to displace the pickup 110 to perform the operation S310. This is because the pickup 110 is already located at the RIA 700 of the optical disk D when performing the operations S240 and S250. In other words, since the RIA 700 or TA 600 (which is adjacent to the RIA 700) to perform the WS in the selected WS study area in operation S310 is the same as or very close to the RIA 700 used to perform the operations S240 and 250, it takes only a small amount of time to displace the pickup 110 to perform the WS study in operation S310. Thus, according to an aspect of the invention, there is minimal travel time for the pickup 110 during the recording process.

According to the embodiment of the present invention as described above, the WS study is performed during the interval occurring in the user data recording operation and thus an optimal WS is obtained while performing the recording operation. However, it is understood that the WS study can be performed at other times, such as when an optical disc D with existing data is first installed in a recording apparatus.

In the above embodiment, whether to perform the WS study during the interval is determined depending on whether the recording information is normally recorded. That is, if the recording information is abnormally recorded, the WS study is performed during the interval, and if the recording information is normally recorded, the WS study is not performed during the interval. This is because the abnormal recording information recording operation may be caused by an inappropriate WS. However, this should not be considered as limiting. Thus, it is understood that, whether to perform the WS study during the interval may be determined based upon other factors in addition to or instead of the abnormal recording information. For instance, the WS study can be performed depending on the number of user data recording operations, the total amount of recorded user data, and whether a set time has elapsed.

As described above, the WS study area is determined depending on whether the number of unusable RIBs is greater than or equal to 5. If the number of unusable RIBs is less than 5, the TA is determined as the WS study area. However, the number 5 to determine the WS study area is an arbitrary value provided for the purposes of the example, and any other number can be used. Moreover, the predetermined number need not be arbitrary, and instead can be chosen according to a number which statistically is more likely to provide a correspondence between a condition of the UDA 300 and a number of unusable RIBs.

As described above, the WS study is performed during the interval occurring during the UD recording operation and thus an optimal WS can be obtained in real time. Accordingly, if an inappropriate WS is obtained at the time of mounting the optical disk D or if the WS is inappropriately updated, the additional WS study performed in real time can make it possible to correct the inappropriate WS.

Although the medium characteristic of the UDA 300 changes due to the multiple recording operations, it is possible to obtain an optimal WS because the WS study is performed in the RIA 700 whose medium characteristic is similar to that of the UDA 300, and thus, the data recording performance can be improved.

While not required, it is understood that all or portions of the method of the present invention can implemented using computer software encoded on one or more computer readable media for use with one or more general or special purpose computers.

The foregoing embodiment and advantages are merely exemplary and are not to be construed as limiting the present invention. The present teaching can be readily applied to other types of apparatuses, and need not be performed on apparatuses that perform both recording and reproducing. Also, the description of the embodiments of the present invention is intended to be illustrative, and not to limit the scope of the claims or equivalents thereof, and many alternatives, modifications, and variations will be apparent to those skilled in the art.

What is claimed is:

1. A write strategy (WS) optimizing method comprising:
    recording buffered user data to a rewritable optical disk according to a first write strategy;
    performing a write strategy study when the recording of the buffered user data is completed to obtain another write strategy; and
    recording additional user data according to the another write strategy, where the additional user data is buffered after the user data is recorded.

2. The WS optimizing method as claimed in claim 1, wherein the performing the WS study comprises performing the WS study while the additional user data is being buffered and until the additional user data is completely buffered.

3. The WS optimizing method as claimed in claim 1, further comprising checking whether recording information about the recorded user data is normally recorded to the rewritable optical disk, wherein the performing the WS study comprises performing the WS study when recording information is abnormally recorded.

4. The write strategy optimizing method as claimed in claim 1, wherein the performing the write strategy study comprises:
    performing an analysis of a recording information area, which stores recording information about the recorded user data;
    based on the analysis of the recording information area, selecting between the recording information area and a test recording area other than the recording information area to be a write strategy study area to perform the write strategy study; and
    performing the write strategy study in the selected write strategy study area.

5. The WS optimizing method as claimed in claim 4, wherein:
    the recording information area comprises blocks for use in storing the recording information, and
    the selecting the WS study area comprises selecting as the WS study area at least one of the indicated blocks of the recording information area that is not expected to be used to record information about the additional user data.

6. The WS optimizing method as claimed in claim 5, wherein the at least one of the indicated blocks selected to be the WS study area comprises blocks previously used to record the recording information a predetermined number of times.

7. The WS optimizing method as claimed in claim 6, wherein the selecting the WS study area comprises selecting as the WS study area the indicated blocks when a number of the indicated blocks is greater than or equal to a predetermined number.

8. The WS optimizing method as claimed in claim 7, wherein the selecting the WS study area comprises selecting as the WS study area the test recording area when the number of indicated blocks is less than the predetermined number.

9. An optical recording and/or reproducing apparatus for use with a rewritable optical disk, comprising:
    a buffer;
    an optical pickup to record buffered data to the rewritable optical disk according to a write strategy (WS);
    an optical pickup driving unit to drive the optical pickup to perform the recording; and
    a controller to control the optical pickup driving unit such that the optical pickup performs a write strategy study to obtain another write strategy after buffered user data has been recorded to the rewritable optical disk, to buffer additional user data in the buffer, and to record the buffered additional user data according to the another write strategy.

10. The optical recording apparatus as claimed in claim 9, wherein the controller performs the WS study until the additional user data to be recorded is completely buffered in the buffer.

11. The optical recording apparatus as claimed in claim 9, further comprising a checking unit to check recording information about the recorded user data is normally recorded to the rewritable optical disk, wherein the controller controls the optical pickup driving unit such that the optical pickup performs the WS study when the checking unit determines that the recording information is abnormally recorded to the rewritable optical disk.

12. The optical recording apparatus as claimed in claim 9, further comprising a determination unit to select between a recording information area, which records recording information about the recorded user data, and a test recording area to be a WS study area to perform the WS study, wherein the controller controls the optical pickup driving unit such that the optical pickup performs the WS study in the determined WS study area.

13. The optical recording apparatus as claimed in claim 12, wherein:
    the recording information area comprises blocks used to record the recording information, and
    the determination unit selects as the WS study area indicated blocks of the recording information area that are not expected to be used in recording the additional user data.

14. The optical recording apparatus as claimed in claim 13, wherein the indicated blocks selected by the determination unit are blocks that have been previously used to record the recording information a predetermined number of times.

15. The optical recording apparatus as claimed in claim 14, wherein the determination unit selects the indicated blocks as the WS study area when a number of the indicated blocks is greater than or equal to a predetermined number.

16. The optical recording apparatus as claimed in claim 15, wherein the determination unit selects the test recording area as the WS study area when the number of the indicated blocks is less than the predetermined number.

* * * * *